United States Patent Office 3,351,120
Patented Nov. 7, 1967

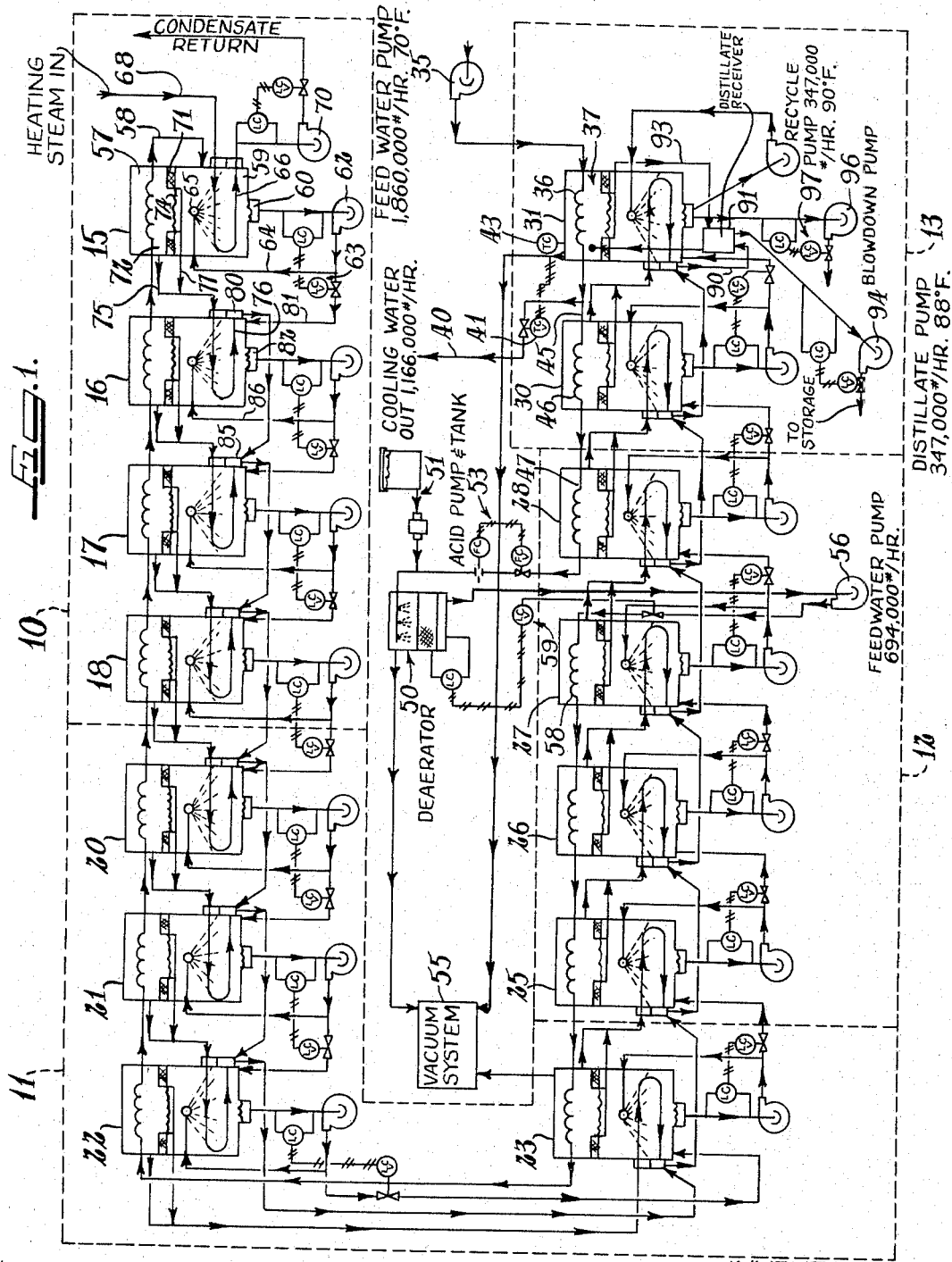

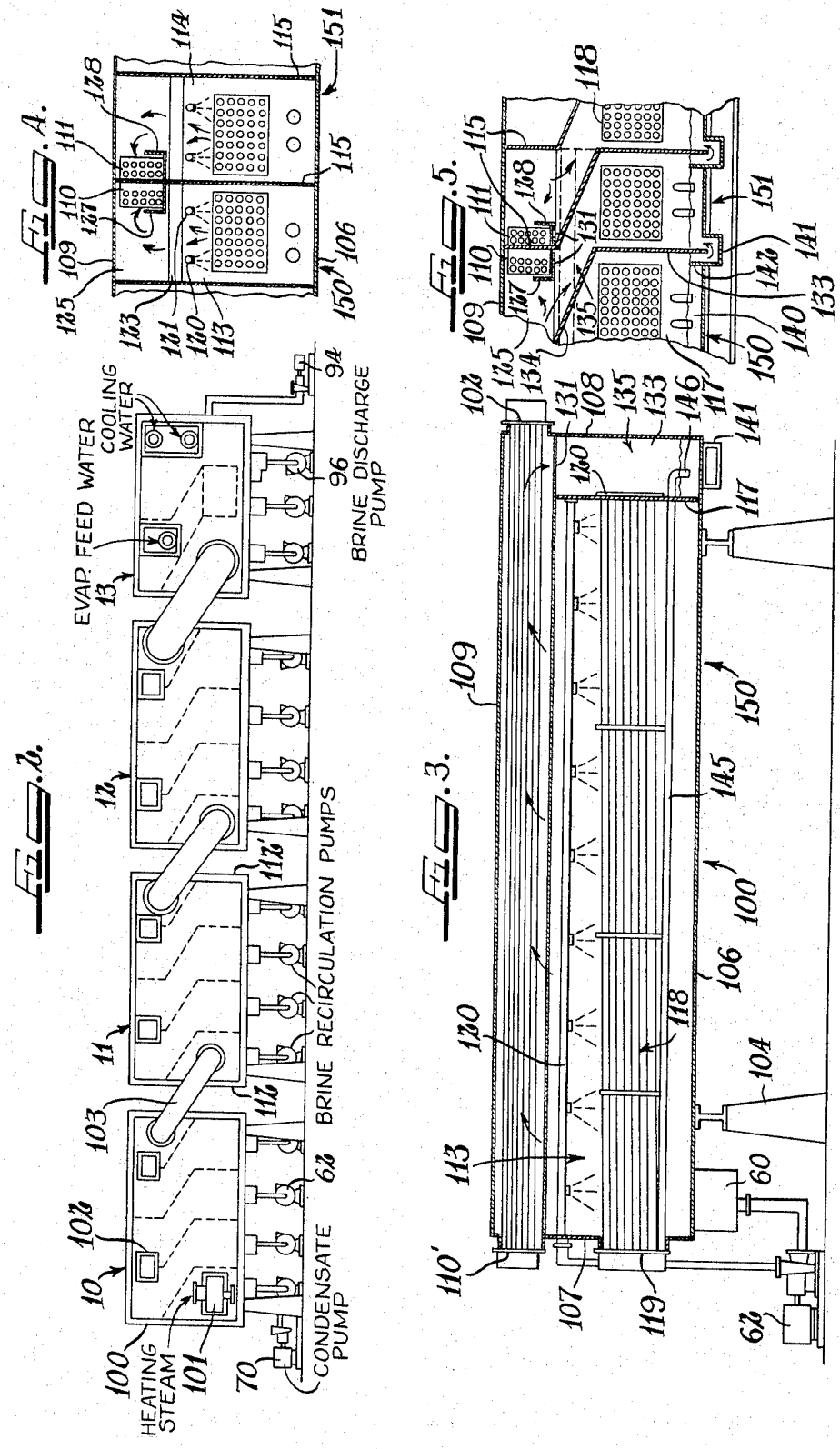

3,351,120
MULTIPLE EFFECT, MULTI-STAGE FLASH
AND FILM EVAPORATOR
Richard W. Goeldner, Brookfield, and Armando B. Steinbruchel, Waukesha, Wis., assignors to Aqua-Chem, Inc., a corporation of Wisconsin
Filed Apr. 30, 1965, Ser. No. 452,205
14 Claims. (Cl. 159—13)

This invention relates to the distillation of liquids and more particularly to an apparatus for evaporating raw sea water into potable water.

The present apparatus is directed to a multiple effect spray film evaporator of the type wherein a preheated liquid is sprayed onto heat exchange tubes carrying a higher temperature vapor so that a portion of the incoming water is evaporated. A portion of the resulting vapor is condensed by passing it in out-of-contact heat exchange relation with the incoming sea water so that the incoming sea water is preheated thereby. The unevaporated portion of the liquid in the first effect is passed from effect-to-effect where additional portions of this liquid are evaporated in a similar manner.

In heretofore known evaporator constructions of this general type the vapors produced in the respective effects have been used to provide the heat of the evaporation by directing the vapors into the above mentioned heat exchange tubes in the evaporation section of each effect. However, this was done in these prior units by passing the vapors in conduits outside the evaporator shell. Because of the state of the vapors these conduits were necessarily quite large and expensive.

It is therefore a primary object of the present invention to provide a new and improved multiple effect evaporator of the general type described in which the vapor ducts for conveying a portion of the vapor produced to the heat exchange section of each effect are formed integrally within the evaporator shell. By providing such a structure the heat transfer characteristics of the evaporator are improved and at the same time the over-all cost of the unit is reduced.

Another object of the present invention is to provide a new and improved evaporator of the type described in which the integral vapor ducts are constructed to convey a portion of the vapor produced in one effect to the heat exchange tubes in the evaporator section of the following effect.

A further object of the present invention is to provide a new and improved spray film evaporator of the type described above in which distillate collection chambers are integrally formed within the evaporator shell adjacent each effect for collecting distillate condensed in the heat exchange tubes in the adjacent evaporator section. Means are also provided for permitting the flow of condensed distillate from the condenser section of each effect to the distillate collection chamber of the following effect thereby further eliminating the need for conduits outside of the evaporator shell.

A still further object of the present invention is to provide a new and improved spray film evaporator of the type described above with integral distillate chambers within the evaporator shell and having distillate loops formed in the bottom of the shell to transfer distillate from effect-to-effect.

Another object of the present invention is to provide a new and improved spray film evaporator of the type described above in which a portion of the concentrate in the bottom well of each effect is recirculated and sprayed over the evaporation heat exchange tubes and a portion is conveyed to the bottom well of the next succeeding effect.

Other objects and advantages will become apparent from the following detailed description taken in connection with the accompanying drawings, in which:

FIG. 1 is a schematic illustration of a multi-effect spray film evaporation plant incorporating the principles of the present invention;

FIG. 2 is a front elevation of a portion of the spray film evaporation plant shown schematically in FIG. 1;

FIG. 3 is a longitudinal cross section of one effect in one of the evaporators;

FIG. 4 is a fragmentary cross section taken generally along line 4—4 of FIG. 3 showing the evaporation sections in two adjacent effects; and FIG. 5 is a fragmentary cross section taken generally along line 5—5 of FIG. 3 showing the vapor ducting and the distillation chambers in several effects of one of the evaporators.

While an illustrative embodiment of the invention is shown and will be described in detail, it should be understood that the principles of the present invention are susceptible of embodiment in many different forms and that this disclosure should be considered an exemplification of the principles of the present invention and is not intended to limit the invention to the embodiment illustrated. The scope of the invention will be pointed out in the appended claims.

The multi-effect spray film evaporation plant as shown in FIGS. 1 and 2 is seen to consist generally of multi-effect spray film evaporation units 10, 11, 12 and 13. The multi-effect spray film evaporator 10 includes four effects 15, 16, 17 and 18. Evaporation unit 11 includes four effects 20, 21, 22 and 23. Spray film evaporator 12 also includes four effects 25, 26, 27 and 28. The last spray film evaporator 13 has two effects 30 and 31. Effect 15 is the first effect at a relatively high pressure while effect 31 is the last effect at a relatively low pressure.

A sea water pump 35 is provided for pumping raw sea water, e.g. 1,860,000 pounds per hour at 70° F., through the condenser heat exchange tubes 36 in condenser section 37 of last effect 31. The condenser section 37 serves to condense the vapor in chamber 37 and also to begin the preheating of the incoming water. Incoming water flowing through condenser tubes 36 however serves primarily to cool the vapors in chamber 37 and for this reason a major portion of the incoming raw water is dumped from the system through line 40. An exemplary flow of cooling water out of the system is 1,166,000 pounds per hour through line 40. A temperature responsive regulating valve 41 is provided in line 40 for controlling the flow of cooling water dumped from the system. Valve 41 is responsive to a temperature sensing element 43 which senses the temperature in the condenser section 37 of effect 31 so that the temperature therein is maintained constant at a desired value by regulating the cooling water flow through line 40.

The portion of the incoming sea water that is not dumped through line 40 is conveyed through line 45 through condenser section 46 of effect 30 wherein it is further preheated and a portion of the vapors in chamber 46 are condensed. The incoming liquid then flows to the next effect, effect 28, and, into condenser section 47, for further preheating of the liquid and condensing of vapors therein in a similar fashion to effect 30.

A deaerator 50 and an acid treatment assembly 51 are provided for treating the incoming sea water between effects 27 and 28. The flow of incoming water from the condenser section 47 is maintained by a suitable constant flow control valve arrangement shown at 53. A small quantity of acid is added by the acid treatment assembly 51 to the feed water to reduce scaling in the system. After being acid treated the incoming feed water passes to the deaerator 50 where entrained air is removed therefrom to further reduce the harmful effects of raw sea water on the evaporation units. The deaerator 50 is connected to a suitable vacuum system 55. The acid treated and deaerated feed water is pumped by a feed water pump 56 to a condenser section 58 of effect 27. A level control valve assembly 59 is provided for regulating the flow from the pump 56 so that a constant level of fluid is maintained in the deaerator.

The feed water is then conveyed serially through the condenser sections of effects 26, 25, 23, 22, 21, 20, 18, 17, 16 and 15, wherein it is preheated in out-of-contact heat exchange relation with the vapors produced in the respective effects.

It should be noted that the vacuum system 55 is connected to effect 31 and effect 23 to provide the necessary pressure differentials in the effects.

The preheated liquid from condenser section 57 of the first effect 15 is passed through line 58 to an evaporation chamber 59 therein. This preheated feed water passes to a suitable bottom well 60 in the bottom of the evaporation chamber 59.

A recirculating concentrate or brine pump 62 is provided for each effect. The pump 62 in association with a level control valve assembly 63 recirculates a portion of the concentrate in the bottom well 60 through line 64 to spray heads 65 in the evaporation chamber 59. The spray heads 65 spray a film of liquid onto heat exchange tubes 66 in the evaporation chamber 59.

Steam is supplied to the heat exchange tubes 66 in the first effect 15 through line 68 from a suitable source. This steam provides the heat of evaporation for the first effect only. Condensate from the heat exchange tubes 66 is withdrawn by a condensate pump 70.

A portion of the liquid sprayed on the heat exchange tubes 66 evaporates into vapor and passes through a suitable entrainment separator 71 into a vapor chamber 72. A portion of these vapors in chamber 72 pass into the condensing section 57 and are condensed producing distillate which falls into condenser collection chamber 74 in the first effect. The uncondensed portion of the vapors produced in the first effect are passed through a suitable vapor duct 75 (described in more detail below) to the inside of heat exchange tubes 76 in effect 16 to provide the heat of evaporation for that effect. The distillate in collection chamber 74 passes through a vapor duct 77 to a distillate collection chamber 80 in effect 16. The unrecirculated concentrate from pump 62 is delivered through line 81 to a bottom well 82 in the second effect 16. The distillate in chamber 80 in effect 16 passes through a suitable distillate loop between the effects to a similar distillate collection chamber 85 in effect 17. The recirculated concentrate in line 86 is sprayed on the heat exchange tubes 76 in effect 16 evaporating a portion of the liquid producing vapor, a portion of which is condensed while the remaining portion is delivered through a vapor duct to the heat exchange tubes of effect 17 to provide the heat of evaporation therein.

The level control valve assemblies 63 provided in each effect serve to maintain the desired level of concentrate in the respective bottom wells by controlling the relative flow between the recirculation line and the evaporation chamber of the next effect.

The flow through the remaining effects of evaporator 10, the effects in the evaporator 11, evaporator 12, evaporator 13 proceeds in a similar fashion to that described above with reference to effects 15, 16 and 17. Distillate in the last effect 31 passes through line 90 to a suitable distillate receiver 91. The distillate receiver 91 also receives distillate from the last effect condenser chamber through line 93. The distillate in the distillate receiver 91 is withdrawn therefrom by a suitable distillate pump 94 and delivered to a suitable storage device for subsequent use. A blow-down pump 94 is provided for removing concentrate from the bottom well of the last effect 31. A level control assembly 97 maintains the desired level of concentrate in the last effect.

Referring to FIG. 2, the evaporators 10 to 13 are shown in more detail illustrating their structural relationship with one another in the plant. Each evaporator is seen to be enclosed by a generally rectangular shell 100. A suitable heating steam inlet fitting 101 is affixed to the shell of the evaporator 10 for supplying the heating steam from an external source to the first effect heat exchange tube bundle. The condensate return pump 70 is mounted on the floor adjacent the first effect of evaporator 10. Condenser tube sheets 102 on the shell of each evaporation unit are located so that the condenser tubes of adjacent effects are next to one another and both supported in the same sheet thereby providing a simplified evaporator structure. The brine recirculation pumps 62 are seen to be mounted on the floor beneath the respective evaporator shells.

A suitable vapor duct 103 is provided between each evaporation unit to convey vapors from the last effect of each evaporation unit to the heat exchange tube bundle of the first effect of the following evaporation unit.

The distillate pump 94 is seen to be connected to receive distillate from the last effect of evaporation unit 13.

Referring now to FIGS. 3 to 5, the structure of the evaporator units 10 to 13 is shown in more detail. In FIG. 3 the shell 100 is seen to be supported on suitable pedestals 104 above the floor of the installation. The shell 100 consists generally of a horizontal bottom wall 106, a vertical rear wall 107, a vertical front wall 108, a horizontal top wall 109 and vertical side walls 112 and 112' (see FIG. 2) connected together to form a box-like shell. Condenser tube bundles 110 and 111 are located adjacent one another and extend the length of the shell being supported at their ends in tube sheets 102 and 110' affixed to the forward wall 108 and the rear wall 107, respectively. Evaporation chambers 113 and 114 are defined by vertical partitions 115 which extend from the bottom wall 106 to the top wall 109. Alternate partitions 115 extend between the condenser tube bundles 110 and 111. Partitions 115 extend longitudinally from the rear wall 107 to a perpendicular, vertically disposed partition 117 shown in FIG. 3.

The partition 117 defines the forward end of the evaporation chambers in the effects. Partition 117 is generally parallel to the forward wall 108 of the shell and extends from one side of the evaporator shell to the other. A generally rectangular heat exchange tube bundle 118 is provided in each effect. These tube bundles are supported in tube sheets 119 and 120 mounted in the rear wall 107 and the partition 117, respectively.

Spray pipes 120 and 121 are provided in each effect and are mounted in the rear wall 107 at one end and the partition 117 at the other end. Immediately above the spray pipes a horizontally extending demister 123 is provided for removing liquid droplets from the rising vapor in each effect. The demister extends between the partitions 115 and from the rear wall 107 to the partition 117. The demisters 123 along with the partitions 115 and the upper wall 109 define vapor chambers 125 in each effect. Referring to FIGS. 4 and 5, back-to-back L-shaped members 127 and 128, connected to every other partition 115, define with the partitions 115 condenser distillate chambers 129 and 130 respectively. Chamber 129 collects distillate from the left effect while chamber 130 collects distillate from the right effect as shown in FIGS. 4 and 5. The L-shaped members 127 and 128 extend from the rear wall 107 to the front wall 108 over the upper edge of the partition 117. Suitable holes 131 are provided in the forward ends of the L-shaped members to permit distillate to flow from the condenser chambers.

Integral vapor ducts are provided in each evaporation unit for directing vapor produced in each effect to the heat exchange tubes of the following effect. For this purpose generally vertical partitions 133 are mounted between the front wall 108 and the partition 117. Angular partitions 134 are connected at their lower ends to the upper ends of partitions 133 and at their upper ends to the lower edges of partitions 115 which extend over the partition 117 to the front wall 108. The partitions 133 and 134 define vapor ducts 135 which serve to direct vapor from the vapor chamber 125 in one effect to the heat exchange tube bundle 118 in the next effect. The partitions 133 and 134 define the sides of the duct while the forward wall 108 and the partition 117 define the forward and rear sides of the duct so that they perform multiple functions and provide an integral duct arrangement within the shell 100.

Integral distillate collection chambers 140 are provided in each effect for collecting distillate from the adjacent heat exchange tube bundle, distillate from the condenser chamber of the prior effect and distillate from the distillate collection chamber of the prior effect. Distillate loops 141 formed integrally in the bottom wall 106 of the shell serve to convey distillate from effect to effect. Because of the successively lower pressures in the distillate collection chambers a portion of the distillate so conveyed flashes producing additional vapor for the adjacent heat exchange tube bundle. Suitable weirs 142 maintain the proper level of distillate in the collection chambers 140. The lower edges of the vertical duct partitions 133 are spaced from the bottoms of loops 141 and define therewith conduits for directing distillate from one chamber to the following chamber.

Distillate collected in the L-shaped chamber member 127 associated with the left effect shown in FIG. 5 flows through hole 131, down the vapor duct 135 and into the distillate collection chamber at the bottom of the vapor duct in the next succeeding effect, i.e., the full right-hand effect shown in FIG. 5.

A distillate return pipe 145 is provided for each of the heat exchange tube bundles 118 for conveying distillate therefrom to the adjacent distillate collection chamber 140. More than one return pipe may be provided for each effect if desired. Return pipes 145 are mounted in partition 117 as shown in FIG. 3 and have downwardly turned discharge ends 146 opening below the upper level of the distillate in the distillate collection chamber 140. The distillate loops 141 and their associated weirs 142 maintain the level of distillate in the chambers above the discharge ends of the return pipes 145. In this manner the distillate return pipes are always submerged to prevent incoming vapor from entering the return pipe and inhibiting drainage therein.

The operation of the evaporation structure shown in FIGS. 3 to 5 is as follows. For the purpose of explanation the evaporation effect shown in FIG. 3 and the left effect in FIG. 4 and FIG. 5 are designated effect 150, and the right adjacent effect in FIGS. 4 and 5 is designated effect 151. It should be noted, however, that these effects represent any two adjacent effects in the evaporators 10 to 13. A portion of the vapor produced in the preceding effect is directed by the vapor ducting into the heat exchange tube bundle in effect 150. The brine recirculation pump 62 recirculates a portion of the brine from bottom of the evaporation chamber 113 in effect 150 through the spray pipes 120 and 121 whereby the concentrate is sprayed on the heat exchange tube bundle producing vapor. The vapor travels upwardly through the demister 123 and into the vapor chamber 125 in the effect 150. A portion of these vapors passes over the condenser tubes 110 and is condensed falling into the chamber defined by the L-shaped member 127 and the adjacent partition 115. This condensed distillate flows down the L-shaped member 127, through hole 131 and into the distillate collection chamber 140 in effect 151. The remaining portion of the vapor in the vapor chamber in effect 150 passes down duct 135 which directs the vapor into the heat exchange tube bundle 118 in effect 151 to provide the heat for evaporation therein. A portion of the distillate from effect 150 flowing around loop 141 flashes in effect 151 supplementing the vapor from the vapor chamber in effect 150. The return pipe 145 in effect 150 conveys the condensed distillate inside the heat exchange tube bundle in effect 150 to the distillate collection chamber associated therewith.

The brine recirculation pump associated with effect 150 also serves to convey the remaining concentrate in chamber 113 to chamber 114. The brine recirculation pump 62 associated with effect 151 directs a portion of the concentrate in the bottom of evaporation chamber 114 through the spray pipe 120 therein producing vapor. The vapor so produced in effect 151 passes into the vapor chamber 125 in that effect and a portion thereof is condensed over condenser tubes 111 and the remaining portion passes down the angled ducting into the heat exchange tube bundle in the following effect. The condensed distillate in L-shaped member 128 flows out the hole 131 and into the distillate collection chamber at the bottom of the vapor duct in the following effect.

We claim:

1. A multiple effect evaporator, comprising: an enclosing housing member; a plurality of evaporation chambers in said housing provided by generally vertical, parallel partitions extending within said housing, a plurality of heat exchange tubes in each of said chambers for evaporating liquid; a plurality of vapor chambers in said housing associated with said evaporation chambers, condenser tubes within each of said vapor chambers, said condenser tubes being in heat exchange relation with the vapor in their respective vapor chambers to condense at least a portion of the vapor thus producing distillate, means for conveying incoming liquid serially through said condensing tubes to preheat the incoming liquid, means for conveying the preheated liquid serially through the evaporation chambers; and vapor ducts within said housing, one each adjacent each vapor chamber but separated therefrom, each said duct communicating with said vapor chamber of the upstream effect and the inside of said heat exchange tubes of the next downstream effect so that a portion of the vapor in each effect is directed into said heat exchange tubes to evaporate a portion of the preheated liquid in the respective evaporation chambers.

2. An evaporator as defined in claim 1, wherein each of said vapor ducts includes a generally vertical partition adjacent but spaced from and within one side of said housing, said partition mounting one end of each of said heat exchange tubes, each of said heat exchange tubes opening into said duct so that vapors from said vapor chambers pass into said heat exchange tubes and distillate flows therefrom, and distillate chambers in each of said ducts for collecting distillate condensed in said heat exchange tubes.

3. An evaporator as defined in claim 2, wherein said vapor ducts each include a generally vertical partition member fixed in said housing and generally aligned with a plane passing between said evaporation chambers, an angled partition member connected to each of said generally vertical partition members for directing vapors from the vapor chamber of each effect to the heat exchange tubes of the following effect.

4. An evaporator as defined in claim 3, and further including means for conveying distillate from each distillate chamber to the following distillate chamber, said distillate chambers communicating with the interior of the heat exchange tubes so that a portion of the conveyed distillate flashes producing additional vapor for the adjacent heat exchange tubes.

5. A multiple effect evaporator for producing distillate from a liquid, comprising: a shell, a plurality of evaporation chambers in said shell including generally vertical partitions, a plurality of heat exchange tubes in each chamber generally parallel with and between said partitions, means in each chamber for spraying liquid to be evaporated on said heat exchange tubes, a vapor chamber in said shell above each of said evaporation chambers, a plurality of condensing tubes in each of said vapor chambers for condensing a portion of the vapors and for preheating incoming liquid, and vapor duct means within said shell for conveying a portion of the vapor from said vapor chambers to said heat exchange tubes to provide the heat for evaporation for the sprayed liquid.

6. An evaporator as defined in claim 5, and further including means for recirculating a portion of the concentrate from the bottom of each evaporation chamber to the associated spraying means, and means for conveying another portion of said concentrate to the bottom of the following evaporation chamber.

7. An evaporator as defined in claim 5 wherein said vapor duct means includes a plurality of ducts each associated with one of said vapor chambers, a generally vertical partition adjacent but spaced from and within one end of said shell, said partition supporting one end of each of said heat exchange tubes so that said tubes open into the respective ducts, generally vertical partition members generally aligned with each of said evaporation chamber partitions, angular partition members connected to each of said partition members for directing vapor from each of said vapor chambers to the following heat exchange tubes.

8. An evaporator as defined in claim 7, and further including distillate collection chambers in each effect including said tube supporting partition, said vertical partition members and the bottom of the shell, and means for conveying distillate from said heat exchange tubes to each of said distillate collection chambers.

9. An evaporator as defined in claim 8, and further including distillate loops formed in the bottom of said shell for permitting flow of distillate from one distillate chamber to the next.

10. An evaporator as defined in claim 8, and further including means in said shell for collecting distillate from said condensing tubes, and means in each of said vapor ducts for permitting flow of distillate from said condensing distillate collecting means to each of said distillate collection chambers.

11. A multiple effect evaporator, comprising: an enclosing housing member, a plurality of evaporation chambers in said housing provided by generally vertical, parallel partitions extending within said housing, a plurality of heat exchange tubes in each of said chambers for evaporating liquid, a plurality of vapor chambers in said housing associated with said evaporation chambers, condenser tubes within each of said vapor chambers, said condenser tubes being in heat exchange relation with the vapor in their respective vapor chambers to condense at least a portion of the vapor thus producing distillate, means for conveying incoming liquid serially through said condensing tubes to preheat the incoming liquid, means for conveying the preheated liquid serially through the evaporation chambers, vapor ducts within said housing one each adjacent each vapor chamber but separated therefrom, each said duct communicating with said vapor chamber of the upstream effect and the inside of said heat exchange tubes of the next downstream effect so that a portion of the vapor in each effect is directed into said downstream heat exchange tubes to evaporate a portion of the preheated liquid in the respective evaporation chambers, each of said vapor ducts including a generally vertical partition adjacent and parallel to but spaced from one end of said housing, said partition mounting one end of each of said heat exchange tubes, each of said heat exchange tubes opening into said duct so that vapors from the associated vapor chamber passes into said heat exchange tubes and distillate flows therefrom, a distillate chamber in each of said ducts for collecting distillate condensed in said heat exchange tubes, and conduit means in said housing for conveying distillate from said heat exchange tubes to said distillate chambers, one end of said conduit means being submerged in the distillate in said distillate chambers to prevent vapors in said duct from entering said conduit means.

12. A multiple effect evaporator for producing distillate from a liquid, comprising: a shell, a plurality of evaporation chambers in said shell including generally vertical parallel partitions, a plurality of heat exchange tubes in each chamber generally parallel with and between said partitions, means in each chamber for spraying liquid to be evaporated on said heat exchange tubes, a vapor chamber in said shell above each of said evaporation chambers, a plurality of condensing tubes in each of said vapor chambers for condensing a portion of the vapors and for preheating incoming liquid, vapor duct means within said shell for conveying a portion of the vapor from said vapor chambers to said heat exchange tubes to provide the heat for evaporation for the sprayed liquid, said vapor duct means including a plurality of ducts each associated with one of said vapor chambers, a generally vertical partition adjacent but spaced from one end of said shell, said partition supporting one end of each of said heat exchange tubes so that said tubes open into the respective ducts, generally vertical partition members generally aligned with each of said evaporation chamber partitions, angular partition members connected to each of said partition members for directing vapor from each of said vapor chambers to the following heat exchange tubes, distillate collection chambers in each effect including said tube supporting partition, said vertical partition members and the bottom of the shell, means for conveying distillate from said heat exchange tubes to each of said distillate collection chambers, said distillate conveying means including a return pipe connected at one end with the other end of the heat exchange tubes in each evaporation chamber and extending into and discharging at its other end in the respective distillate collection chambers, and means for maintaining the distillate level above the discharge end of said return pipe to prevent vapor in the vapor duct from entering therein.

13. A multiple effect evaporator comprising an enclosed housing member; a plurality of evaporation chambers in said housing member, a plurality of heat exchange tubes in each of said chambers for condensing liquid; a plurality of vapor chambers in said housing associated with said evaporation chambers, condenser tubes adjacent each of said vapor chambers, said condenser tubes being in heat exchange relation with the vapor in the associated chambers to condense at least a portion thereof producing distillate; a plurality of distillate collection chambers in said housing one associated with each of said evaporation chambers, each of said distillate collection chambers being separate from the associated heat exchange tubes but in communication with the interior of the associated heat exchange tubes; and duct means within said housing for conveying distillate from the condenser tubes associated with each evaporation chamber to the distillate collection chamber associated with the following heat exchange tubes whereby a portion of the conveyed distillate flashes producing additional vapor for the heat exchange tubes.

14. A multiple effect evaporator as defined in claim 13 including distillate loops within said housing member interconnecting said distillate collection chambers for conveying distillate from one effect to another.

References Cited
UNITED STATES PATENTS

| | | | |
|---|---|---|---|
| 1,031,199 | 7/1912 | Rigney | 159—28 X |
| 1,200,996 | 10/1916 | Soderlund et al. | 159—24 |
| 2,078,377 | 4/1937 | Fox et al. | 202—174 |
| 2,165,044 | 7/1939 | Fox et al. | 202—174 |
| 2,295,088 | 9/1942 | Kleucker | 62—126 |
| 2,490,795 | 12/1949 | Tyden | 159—23 |
| 2,941,590 | 6/1960 | Rosenblad | 159—47 |
| 2,942,657 | 6/1960 | Kleinschmidt | 159—47 |

(Other references on following page)

UNITED STATES PATENTS

| | | | |
|---|---|---|---|
| 3,146,177 | 8/1964 | Chalmers et al. | 159—2 X |
| 3,180,805 | 4/1965 | Chirico | 159—2 X |
| 3,219,553 | 11/1965 | Hughes | 159—2 |
| 3,223,144 | 12/1965 | Dedert | 159—17 X |
| 3,228,859 | 1/1966 | Frankel et al. | 159—2 |
| 3,245,460 | 4/1966 | Loebel | 159—47 |
| 3,303,106 | 2/1967 | Standiford | 159—18 X |

OTHER REFERENCES

Office of Saline Water, U.S. Dept. of Interior, January 1963, "Saline Water Report for 1962," pp. 103–111, particularly p. 105, Fig. 79A. (Copy in Group 180, Class 202.)

Office of Saline Water, U.S. Dept. of Interior, Third Annual Report, September 1964, Saline Water Conversion, Demonstration Plant No. 1, Freeport, Tex., Research and Development Progress Report No. 123, p. 81 (dwg.). (Group 180, Class 202.)

NORMAN YUDKOFF, *Primary Examiner.*

WILBUR L. BASCOMB, JR., *Examiner.*

J. SOFER, *Assistant Examiner.*